United States Patent Office 3,657,217
Patented Apr. 18, 1972

---

3,657,217
MONOAZO DYES CONTAINING AN INDOLE
Heinrich Hiller, Mannheim, and Helmut Pfitzner, Ludwigshafen, Germany, assignors to Badische Anilin- & Soda-Fabrik Aktiengesellschaft, Ludwigshafen (Rhine), Germany
No Drawing. Filed Sept. 8, 1969, Ser. No. 856,199
Claims priority, application Germany, Sept. 12, 1968,
P 17 94 127.4
Int. Cl. C09b 45/00
U.S. Cl. 260—165                                  2 Claims

---

ABSTRACT OF THE DISCLOSURE

Pigment dyes derived from an orthodicarbonyl compound, a phenylhydrazine ortho-sulfonic acid and a metal salt; they are useful especially for producing printing inks for paper and textile material.

---

The invention relates to new pigment dyes having the general Formula I:

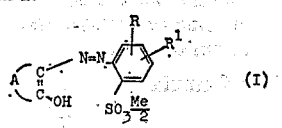

were

A denotes a radical having the formula:

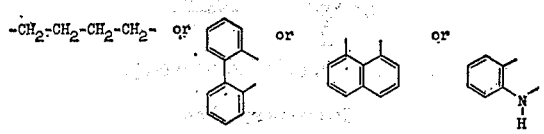

R denotes a hydrogen atom, fluorine atom, chlorine atom, bromine atom, alkyl group having one to four carbon atoms, acetyl group, acetylamino group or nitro group;
$R^1$ denotes a hydrogen atom, chlorine atom or methyl group; and
Me denotes a calcium atom, barium atom or lead atom.
Chlorine is preferred as the R substituent.

Ethyl, propyl, butyl and particularly methyl are suitable as alkyl groups.

The new pigments are yellow to red, have very high tinctorial strength, are resistant to acids to a high degree and have great brilliance. They have outstanding fastness to solvents and good light fastness. They are suitable for coloring surface-coating compositions, plastics, paper pulp and particularly printing inks for paper and textile material.

The new pigments may be used either direct or after special treatment in a finishing process such as salt milling or grinding in a solvent. Barium salts having the Formula I are preferred.

The new pigments may be prepared for example by condensing a compound having the formula

by a method known from the literature with a phenylhydrazine-o-sulfonic acid having the Formula III:

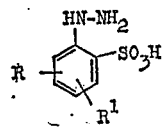

and converting the product into the corresponding metal salt. The following compounds are compounds having the Formula II: cyclohexanedione-(1,2), phenanthrenequinone, acenaphthaneequinone and particularly isatin.

A particularly suitable phenylhydrazine-o-sulfonic acid is the compound bearing chlorine as substituent in the p-position and which may additionally contain a methyl group.

The condensation reaction may be carried out in solvents such as methanol, ethanol, isobutanol, glacial acetic acid, dimethylformamide, or in mixtures thereof with water.

Metallization may in principle be carried out in the same solvents; mixtures of dimethylformamide and water are most advantageous.

The invention is illustrated by the following examples.
The references to parts and percentages in the following examples are by weight.

EXAMPLE 1

A solution of 22 parts of 2-hydrazino-5-chloro benzenesulfonic acid in 700 parts of hot 50% dimethylformamide is added to 21 parts of phenanthrenequinone dissolved in 200 parts of boiling glacial acetic acid. The mixture is boiled under reflux for half an hour and then stirred into a boiling solution of 20 parts of barium acetate in 500 parts of water. The whole is stirred for another half an hour, the dye is suction filtered, washed with hot water and dried at 70° C. at subatmospheric pressure. 43 parts (89% of the theory) of an orange pigment having the formula:

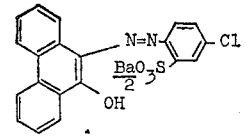

is obtained.

EXAMPLE 2

A solution of 22 parts of 2-hydrazino-5-chlorobenzenesulfonic acid in 700 parts of hot 50% dimethylformamide is added to a boiling solution of 14.7 parts of isatin in 150 parts of glacial acetic acid. The mixture is boiled for a few minutes under reflux and then stirred into a boiling solution of 20 parts of barium acetate in 500 parts of water. After stirring for a short time, the precipitate is suction filtered while hot, washed with hot water and dried. 36 parts (86% of the theory) of a yellow pigment having the formula:

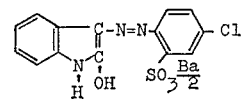

is obtained.

70 parts of this pigment is kneaded with 30 parts of the reaction product of 1 mole of sperm oil alcohol and 24 to 25 moles of ethylene oxide for thirty minutes in a kneader at a temperature of about 70° to 80° C., if necessary with water. The kneaded product is rolled and then processed with water or a mixture of water and ethylene glycol into a 35% pigment dispersion. This pigment dispersion is eminently suitable as a printing ink for textile printing.

EXAMPLE 3

14.7 parts of isatin, 23.6 parts of 2-hydraxino-4-methyl-5-chlorobenzenesulfonic acid and 20 parts of barium acetate are reacted as described in Example 2. 40 parts (92% of the theory) of the yellow pigment having the formula:

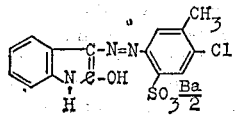

is obtained.

20 parts of the pigment thus obtained is ground with 6 parts of the ethylene oxide adduct specified in Example 2 and 74 parts of water in an attrition mill at about 25° C. for twenty-four hours. A product is thus obtained which is eminently suitable as a printing ink for pigment printing.

The compounds set out in the following table and characterized by the substituents given may be prepared in an analogous manner and also have numerous applications as pigments.

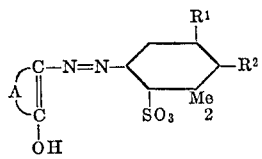

| Ex. No. | A | $R^1$ | $R^2$ | Me | Color of pigment |
|---|---|---|---|---|---|
| 4 | ⌬—NH | H | H | Ca | Yellow. |
| 5 | Same as above | H | H | Ba | Do. |
| 6 | do | H | H | Pb | Do. |
| 7 | do | Cl | H | Ba | Do. |
| 8 | do | H | $CH_3$ | Ba | Do. |
| 9 | do | H | Cl | Pb | Do. |
| 10 | do | Cl | $CH_3$ | Ba | Do. |
| 11 | do | H | $NO_2$ | Ba | Do. |
| 12 | do | H | $HNCOCH_3$ | Ba | Do. |
| 13 | ⌬—⌬ | H | $HNCOCH_3$ | Ba | Red. |
| 14 | Same as Ex. No. 13 | Cl | $CH_3$ | Ba | Orange. |
| 15 | do | H | Cl | Ba | Do. |
| 16 | do | H | Cl | Pb | Red. |
| 17 |  | H | Cl | Ba | Orange. |
| 18 | Same as above | $CH_3$ | Cl | Pb | Red. |
| 19 | $CH_2—CH_2—CH_2—CH_2$ | H | Cl | Ba | Yellow. |
| 20 | Same as above | H | Cl | Pb | Do. |

We claim:
1. A pigment dye of the formula

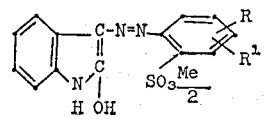

wherein

R is hydrogen, fluorine, chlorine, bromine, alkyl of one to four carbon atoms, acetyl, acetylamino or nitro,
$R^1$ is hydrogen, chlorine or methyl, and
Me is calcium, barium or lead.

2. A dye of the formula

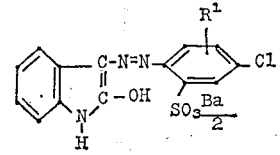

wherein $R^1$ is hydrogen, chlorine or methyl.

References Cited

FOREIGN PATENTS 1,361,694   4/1964   France _____ 260—165

JOSEPH REBOLD, Primary Examiner

D. M. PAPUGA, Assistant Examiner

U.S. Cl. X.R.

260—146 R, 149, 192; 106—22